United States Patent [19]
Franklin

[11] Patent Number: 5,193,780
[45] Date of Patent: Mar. 16, 1993

[54] LOW FRICTION BALL VALVE

[76] Inventor: Robert C. Franklin, 914 Bicknell Rd., Los Gatos, Calif. 95030

[21] Appl. No.: 907,764

[22] Filed: Jun. 30, 1992

Related U.S. Application Data

[63] Continuation-in-part of Ser. No. 771,452, Oct. 3, 1991.

[51] Int. Cl.⁵ ............................................. F16K 31/44
[52] U.S. Cl. ....................................... 251/68; 137/554; 251/74; 251/163
[58] Field of Search ................. 137/554; 251/66, 68, 251/162, 163, 74

[56] References Cited

U.S. PATENT DOCUMENTS

| | | | |
|---|---|---|---|
| 1,989,009 | 1/1935 | Heggem | 251/163 |
| 2,200,474 | 5/1940 | Heggem | 251/163 |
| 3,322,149 | 5/1967 | Haenky | 251/163 X |
| 4,821,759 | 4/1989 | Diamond | 251/74 X |

Primary Examiner—Robert G. Nilson
Attorney, Agent, or Firm—Skjerven, Morrill, MacPherson, Franklin & Friel

[57] ABSTRACT

A low friction ball valve used for instance in an automatic shutoff valve system. The valve mechanism includes a spring loaded ball valve normally latched in the open position which is unlatched and hence closes in one version by the contraction of a BioMetal TM wire which activates a torsion spring to rotate the ball valve. When the valve is open, the ball inside the valve rests on rollers so that the ball is held slightly away from the seal of the valve located in the valve body. Closing the valve causes the rollers to snap into detents in the ball, and the ball then comes into firm contact with the seal.

8 Claims, 3 Drawing Sheets

LOW FRICTION BALL VALVE

CROSS-REFERENCE TO RELATED APPLICATION

This application is a continuation-in-part of pending U.S. patent application Ser. No. 07/771,452, filed 10/3/91 entitled "Automatic Shutoff Valve" and incorporated herein by reference.

BACKGROUND OF INVENTION

1. Field of the Invention

This invention relates to a low friction ball valve.

2. Description of the Prior Art

Ball and plug valves are both well known. However, problematically such valves require high rotational forces needed to change the fluid flow condition from ON to OFF or vice versa (i.e., to operate the valve). This is due to the friction between the valve ball and the valve seals. Lubricating the seals is also problematic since the lubricants lose their effect with age. Thus, there is a need for a low friction valve that does not require lubrication.

SUMMARY OF THE INVENTION

A spring-loaded ball valve is normally latched in an open condition thus allowing unimpeded fluid flow. The ball inside the valve rotates so that in the open position a collar on the ball surface is in contact with two rollers fixed in the valve body, and the ball is held away from a seal in the valve body. When the valve ball is rotated 90° to be closed, the rollers snap into detents in the ball surface, and this lets the ball come into firm contact with the seal.

The valve latch mechanism holds the valve in the open condition until it is unlatched (in one version) through the action of a BioMetal TM wire which contracts in length when heated by the passage of electrical current through the wire. Unlatching the latch mechanism allows a torsion spring to apply sufficient torque to the ball portion of the valve to rotate it 90 degrees to the closed position thus shutting off flow. The valve may also be operated manually or by other mechanical or electro-mechanical means. The ball valve allows rotation with minimal friction until the closed position is reached, at which time the ball firmly seats against the sealing O-ring.

DETAILED DESCRIPTION

Figure 1A:
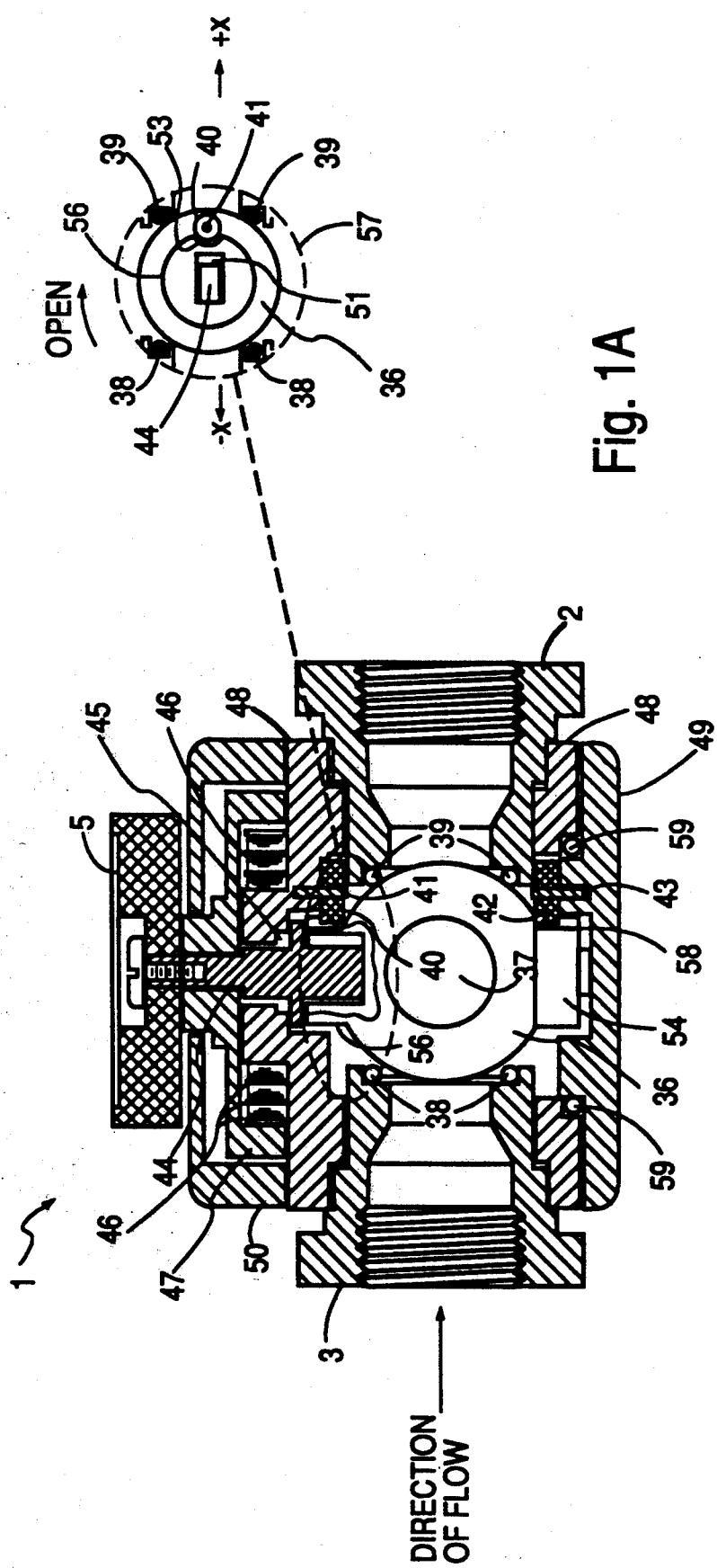
FIG. 1A is a cross-sectional view of a ball valve.

FIG. 1A is a cross-sectional view of the water shutoff valve 1. Valve 1 is a spring-loaded ball valve which permits changing its flow status from ON to OFF or vice versa by rotating the ball through 90 degrees. The valve is shown in a closed condition with valve ball 36 pressing against the O-ring seal 39, thus preventing fluid flow through the pipe fitting and input port 3 to the pipe fitting and output port 2. Through-hole 37 in valve ball 36 provides the path for fluid flow when the valve ball 36 is rotated 90 degrees.

One major problem encountered in prior art ball valves or plug valves pertains to the high rotational forces required to change the fluid flow condition from ON to OFF or vice versa. The high rotational forces are primarily due to the friction between the valve ball and the O-ring seals. This friction becomes more pronounced as the lubricants, normally applied during valve manufacturing, become sticky or hard as they age.

To minimize these friction forces, in accordance with the invention, a novel ball rotation system is used which allows the valve ball 36 to rotate with a small clearance or very slight contact between itself and the O-rings 38 and 39 when in the valve open condition, to prevent contamination particles from entering the valve mechanism. Rollers 40 and 42 which rotate on pins 41 and 43 respectively reduce friction. Roller 40 normally rides on the upper collar surface 56 of valve ball 36 during the open valve portion of rotation. Likewise, roller 42 rides on the lower collar surface 54. In this valve open condition the valve ball lightly touches the O-rings 38 and 39 as previously stated.

The valve-closed condition is more easily understood by the insert view 57 of FIG. IA. In this view the top portion of the valve ball is shown rotated to produce a top view of the valve ball 36. While this inserted view shows the top of valve ball 36 and roller 40, it should be understood that a bottom view would similarly show the valve ball collar 54 and associated roller 42. Again referring to the insert view 57, observe that, in the position shown, roller 40 is resting in detent 53 of the valve ball collar 56 and, while not shown, bottom roller 42 rests in detent 58. This allows the surface of valve ball 36 to press against O-ring 39 due to the resulting inlet water pressure. Although not shown, spring pressure could be provided to ensure ball valve 36 closure against O-ring 39 in the event of low water pressure. This could be accomplished using spring-loaded rollers, or the equivalent, pressing against the water inlet side of valve ball collars 56 and 54. Also note that to allow valve ball 36 to move in a +X direction, the bottom, rectangular end of shaft 44 fits into rectangular slot 51.

To reset the valve to an open condition, knob 5 must be rotated in a clockwise direction as viewed from the top of valve 1. Shaft 44 couples the rotational torque from knob 5 to valve ball 36. O-ring 45 seals against fluid leakage. Once again referring to insert view 57 it can be seen that a clockwise rotation of valve ball 36 causes the outer diameter of upper collar 56 to engage roller 40 in a manner which produces a movement of valve ball 36 in a -X direction. The outer diameter of lower collar 54 likewise engages roller 42. Once knob 5, shaft 44, rotor 47, and valve ball 36 are rotated 90 degrees to a latched, valve open position there is little if any frictional contact between the valve ball 36 surface and O-ring 39.

Bottom cover 49 provides access to the inner cavity of valve body 48 to facilitate assembly. O-ring 59 seals against fluid leakage. Top cover 50 encloses the rotor 47. The valve may be made from materials such as polycarbonate with the valve components being injection molded, or from other plastics, or from metal.

Figure 1B:
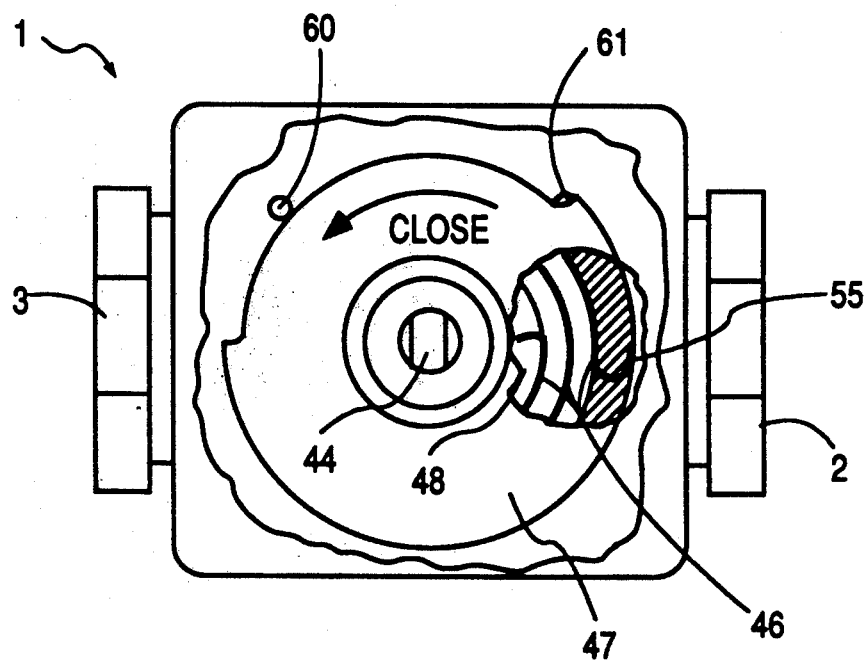
FIG. 1B is a top view of the ball valve with cutaway views.

FIG. 1B is a top view of water shutoff valve 1 showing cutaway views of the rotor 47 and torsion spring 46 locations. Rotor 47 is now shown in a position representing a valve-open condition. The inner coil of torsion spring 46 is shown attached to the hub portion of valve body 48. The outer spring coil is attached to the rotor 47 using a hook arrangement at point 55. Spring 46 is now exerting a counterclockwise torque on rotor 47. The rotor is now locked in a valve-open position by the valve latching mechanism to be described later. When the valve latching mechanism releases the rotor 47 to rotate in a counterclockwise direction in order to establish a valve-closed condition, the amount of rotation is restricted to 90 degrees when rotor surface 61 hits the stop pin 60. Because rotor 47 is physically attached to shaft 44 the valve ball 36 will likewise be placed in a valve-closed condition as previously described in conjunction with FIG. 1A.

Figure 1C:
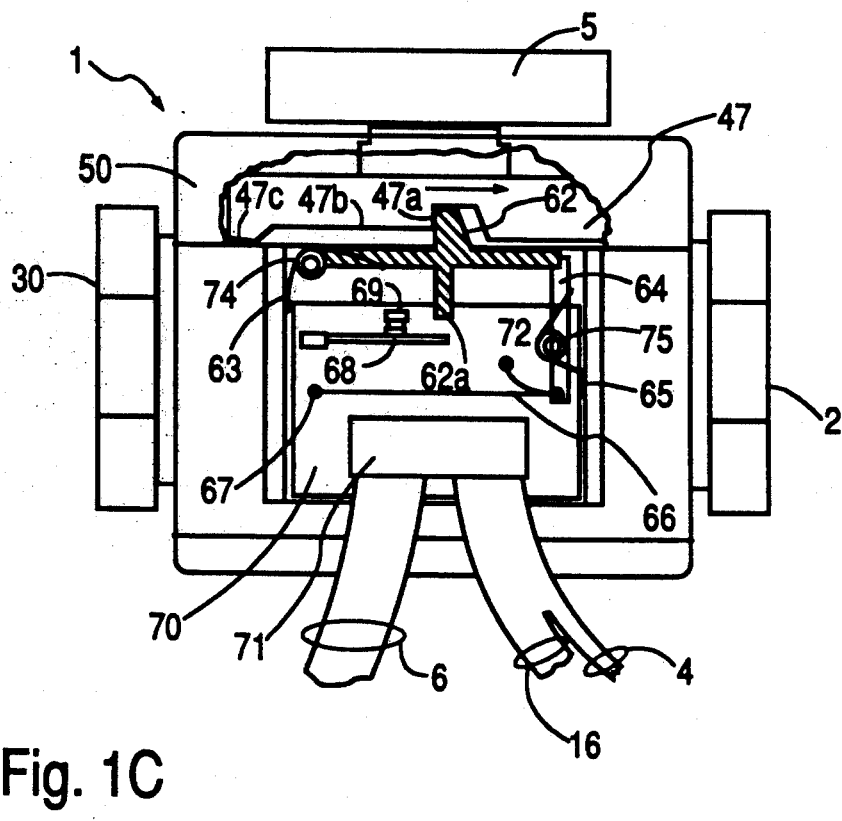
FIG. 1C is a side view of the ball valve to illustrate the latch mechanism.

FIG. 1C shows a cutaway view of the latch mechanism used in one version to hold the valve in an open condition until a valve closure is required. Latching arm 62 engages rotor 47 at surface 47a in order to prevent any rotor movement. Latching arm 62 is pinned at point 74 and would normally rotate in a clockwise direction about that point due to the rotational moment impressed on the latching arm by rotor 47. However, the end of latching arm 62 contacts the lip of trip arm 64 in a manner which does not permit any rotation of the latching arm. Trip arm 64 rotates about point 75 and it receives a counterclockwise retaining torque from wire spring 65 which also holds trip wire 66 in a taut condition.

Trip wire 66 is a special shape memory alloy, metallic wire marketed under the name BioMetal ™ by Mondotronics, Inc., Sunnyvale, Calif., which has the property of contracting in length when heated to a specific temperature. The method of heating involves passing an electrical current, on the order of 400 milliamperes, through the wire. Trip wire 66 is fastened at one end to mounting terminal 67 which, in turn, is fastened to printed circuit board 70. The other end of the trip wire is fastened to the bottom of trip arm 64 with a short extension to terminal 72 which provides a necessary electrical connection to printed circuit board 70.

To initiate a valve-closed condition the following chain of events takes place. First, the necessary drive signal from a control module (not shown) produces a heating current in trip wire 66, thus causing it to contract in length. The resulting force on the lower end of trip arm 64 causes the trip arm to rotate in a clockwise direction about point 75. The top end of trip arm 64 now moves a sufficient distance to release the end of latch arm 62. Latch arm 62 now rotates in a clockwise direction under the pressure of the rotor 47 which easily overcomes the retaining torque of wire spring 63. As rotor 47 rotates toward a valve-closed condition, the tip of latch arm 62 rides in contact with surface 47b. Once the rotor 47, and hence the valve ball 36 have rotated to a valve-closed condition, the tip of latch arm 62 rides in contact with surface 47c. At this position, point 62a of latch arm 62 contacts leaf-spring switch 68 causing its electrical contact to separate from the circuit board mounted contact 69. Had a mechanical malfunction occurred which might cause the valve to jam before it could reach a fully closed condition, the tip of latch arm 62 would not reach the surface 47c and switch 68, 69 contacts would not open, which in turn in one version will cause the associated microcontroller to produce an urgent attention alarm to alert people that a malfunction has occurred. It should also be noted that connector 71 is mounted to printed circuit board 70 to provide the necessary signal routing and interconnection for electrical cables 6, 16, and 4.

Figure 1D:
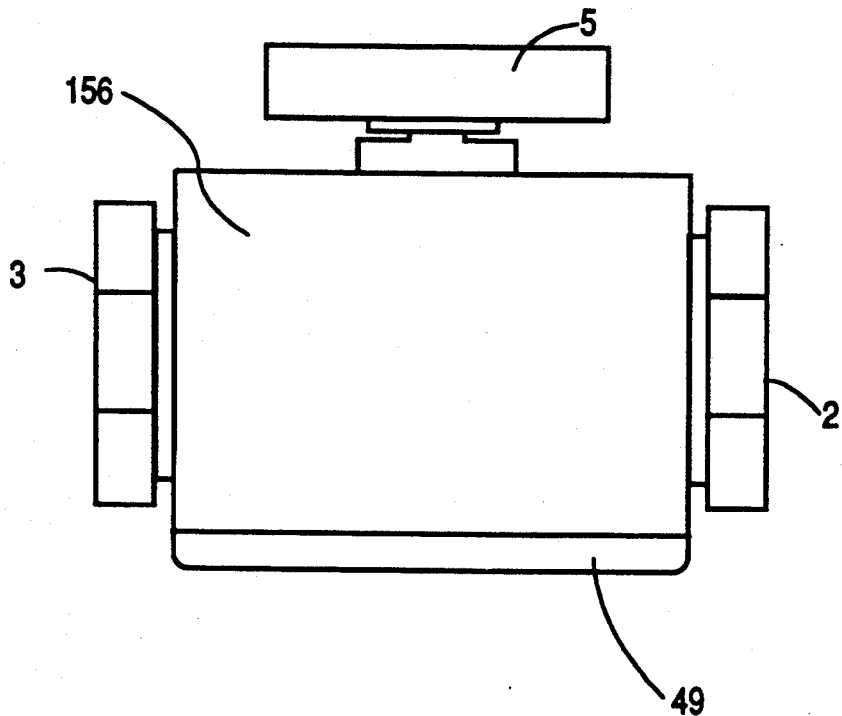
FIG. 1D is a side view of the ball valve with the spring and latch mechanisms removed to provide manual on/off operations.

FIG. 1D shows a second version of shutoff valve 1 without the above-described spring and latch mechanisms, resulting in a simple, manually or electromechanically controlled ball valve having the low friction capabilities described in connection with FIG. 1A. The elements removed to provide the above valve configuration include spring 46, rotor 47, and top cover 50 shown in FIG. 1A, and latch arm 62, spring 63, along with printed circuit board 70 and all associated items mounted on or attached to the circuit board as shown in FIG. 1C.

The second version of the valve body is now shown as element 156. It can now be seen that rotation of the knob 5 through 90 degrees rotation, either manually or by other means, will cause the amount of flow of liquid or gas through the valve to vary from full, unrestricted flow to zero flow. This provides low rotational torque during approximately 80 degrees of valve ball rotation until rollers 40 and 42 engage the detents 53 and 58 (as previously described) at near to 90 degrees, at which position the valve is in a full off (closed) condition.

The primary advantage in using a latched valve is that it requires no holding power once it has been tripped to a closed position. Another advantage is that it requires no fluid flow through the valve or pressure differential across the valve to activate its closure mechanism, as is the case with certain hydraulically or pneumatically activated valves. It should also be recognized that, although the described valve utilizes a BioMetal ™ wire to activate the unlatching mechanism, a device such as a solenoid could also be used. In addition, a manual means of activating the unlatching mechanism could be used.

The description of the invention herein is illustrative and not limiting; further modifications will be apparent to one skilled in the art, in the light of this disclosure and are included in the scope of the appended claims.

I claim:

1. A low friction ball valve comprising:
 a valve body defining an interior passage for fluid flow and having a seal disposed at least at one end of the passage;
 at least two rollers each mounted on a pin fixed in the interior passage of the valve body;
 a valve ball defining an interior passage and rotating within the valve body passage, closing the valve body passage in a first position by bearing against the seal, with the rollers each fitting within a detent in the valve ball in the first position, and the valve ball in a second position aligning its interior passage with that of the valve body, wherein in the second position the rollers each contact an outer surface of the valve ball, thereby reducing friction between the valve ball and the seal.

2. The device of claim 1, further comprising:
 a rotor connected to the valve ball and extending through the valve body;
 a spring in contact with the rotor and with the valve body;
 a latch engaging the rotor and holding the valve ball in the second position;
 a stop on the valve body for limiting rotation of the rotor to a predetermined amount between the first and second positions of the valve ball; and
 a release mechanism for releasing the latch, allowing the valve ball to rotate to the first position.

3. The device of claim 2, wherein the release mechanism comprises a length of wire which shortens when heated, and one end of which is connected to the latch; and further comprising an electrical connection to the length of wire for applying an electrical current thereto.

4. The valve of claim 2, further comprising a switch on the valve body contacted by the latch only when the valve ball is in the first position, thereby indicating that the valve ball has rotated into the first position.

5. The valve of claim 1, further comprising a shaft connected to the valve ball and extending to the exterior of the valve body.

6. The valve of claim 1, wherein the valve ball rotates about 90° from the first position to the second position.

7. The valve of claim 1, wherein the seal is an O-ring.

8. The valve of claim 1, wherein in the second position the valve ball has substantially no frictional contact with the seal.

* * * * *